(12) United States Patent
Deiss et al.

(10) Patent No.: US 7,533,644 B2
(45) Date of Patent: May 19, 2009

(54) AIR INDUCTION MODULE FOR A COMBUSTION ENGINE HAVING PULSE CHARGING

(75) Inventors: Siegfried Deiss, Mötzing (DE); Manfred Heinzlmeir, Regensburg (DE); Thomas Mann, Nidderau-Windecken (DE); Matthias Zentgraf, München (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 10/595,254

(22) PCT Filed: Sep. 21, 2004

(86) PCT No.: PCT/EP2004/052260
§ 371 (c)(1),
(2), (4) Date: Feb. 16, 2007

(87) PCT Pub. No.: WO2005/031133

PCT Pub. Date: Apr. 7, 2005

(65) Prior Publication Data
US 2007/0251471 A1    Nov. 1, 2007

(30) Foreign Application Priority Data
Oct. 2, 2003    (DE) ................ 103 46 005

(51) Int. Cl.
*F02M 35/10* (2006.01)
*F02B 33/00* (2006.01)
(52) U.S. Cl. .................. 123/184.54; 123/559.1
(58) Field of Classification Search .............. 123/559.1, 123/184.54
See application file for complete search history.

(56) References Cited

U.S. PATENT DOCUMENTS

| 4,612,903 | A | * | 9/1986 | Urabe et al. ........... 123/184.45 |
| 5,179,917 | A | * | 1/1993 | Hokazono et al. ...... 123/184.54 |
| 5,495,830 | A | * | 3/1996 | Wu ........................ 123/184.54 |
| 5,704,327 | A | * | 1/1998 | Dohring ................ 123/184.54 |
| 6,408,811 | B1 |   | 6/2002 | Glovatsky et al. ...... 123/184.61 |
| 6,637,405 | B2 |   | 10/2003 | Kreuter ...................... 123/337 |
| 6,672,917 | B2 |   | 1/2004 | Matsuda et al. ............... 440/76 |
| 2001/0035165 | A1 |   | 11/2001 | Satou ......................... 123/470 |

(Continued)

FOREIGN PATENT DOCUMENTS

DE    10137828    8/2001

(Continued)

OTHER PUBLICATIONS

International Search Report and Written Opinion for International Application No. PCT/EP2004/052260 (14 pages), Jan. 14, 2005.

(Continued)

*Primary Examiner*—Noah Kamen
(74) *Attorney, Agent, or Firm*—Baker Botts L.L.P.

(57) ABSTRACT

In this air induction module, the induction pipe has two separate induction pipe bodies (1, 2) with induction pipe sections that, together, form the induction pipes. The second induction pipe body (2), which can be attached to the cylinder head of the combustion engine, contains, in its induction pipe sections, a pulse charging valve (3) with an associated actuator. In addition to the pulse charging valves, the control electronics thereof can be integrated in the air induction module.

14 Claims, 3 Drawing Sheets

U.S. PATENT DOCUMENTS

2003/0024502 A1   2/2003   Kreuter .............. 123/337
2003/0094156 A1   5/2003   Kondo ............... 123/336

FOREIGN PATENT DOCUMENTS

EP   052768/3   8/1992
EP   1236875    9/2002
JP   58160512   9/1983

OTHER PUBLICATIONS

Richard Van Basshuysen et al., "Handbuch Verbrennungsmotor", pp. 386-388, Jun. 29, 2006.

* cited by examiner

AIR INDUCTION MODULE FOR A COMBUSTION ENGINE HAVING PULSE CHARGING

CROSS-REFERENCE TO RELATED APPLICATIONS

This application is a U.S. national stage application of International Application No. PCT/EP2004/052260 filed Sep. 21, 2004, which designates the United States of America, and claims priority to German application number DE 103 46 005.5 filed Oct. 2, 2003, the contents of which are hereby incorporated by reference in their entirety.

TECHNICAL FIELD

The present invention relates to an air induction module for a combustion engine having pulse charging.

BACKGROUND

During pulse charging (dynamic charging) pulse charging valves (timed valves) are used in the induction pipe of the combustion engine to increase the mass of air in the combustion chamber by the pulse charging valve opening and closing once or repeatedly during the opening phase of the inlet valve, reference might be made, for example, to 'Combustion Engine Manual', second edition, page 386, section 10.5.3. Pulse charging can be used both for petrol and diesel combustion engines.

The present application relates, in particular, to the integration of such pulse charging valves in the induction pipe of the combustion engine. In this connection, the following observations, amongst others, can be considered:

The pulse charging valves and their actuators should be semi-rigidly attached to the housing of the combustion engine. The electrical power loss in the actuators should be removed by the air flowing through the air induction module. Moreover, the electronic control device required to control the actuators, including the electrical contact of the actuators, should be integrated in the air induction module, whereby attention should be paid to the thermal and mechanical connection of the electronic control device to the combustion engine and the removal of the electrical power loss of the electronics in the form of heat should be ensured at all operating points.

SUMMARY

The object achieved by the present invention is therefore to provide an air induction module for a combustion engine with pulse charging, in which the pulse charging valves and their actuators are integrated as optimally as possible in the induction pipe, with regard to space requirements, constructional cost, vibrational load, heat removal and further operational characteristics.

This object can be achieved by an air induction module for a combustion engine having pulse charging, with an induction pipe with individual induction pipes depending on the number of cylinders of the combustion engine, wherein the induction pipe comprises a first induction pipe body with an air collector and individual induction pipe sections and a second induction pipe body with individual induction pipe sections which can be attached to the cylinder head of the combustion engine, wherein the first and second induction pipe bodies are connected to one another by a flanged joint in such a way that their induction pipe sections together form the individual induction pipes of the induction pipe, and one respective pulse charging valve arranged with an associated actuator in the induction pipe sections of the second induction pipe body.

The pulse charging valves can be configured as poppet valves. The actuators of the induction pipe valves may consist of solenoids. Each pulse charging valve with the associated actuator may form a component part which during assembly of the air induction module can be respectively inserted in the correspondingly formed associated induction pipe section of the second induction pipe body. The flanged joint between the two induction pipe bodies may comprise an intermediate plate with through holes corresponding to the individual induction pipes which can be attached to the second induction pipe body by screw connections such that the intermediate plate holds the pulse charging valves with their actuators in the induction pipe sections of the second induction pipe body. The intermediate plate can be attached to the first induction pipe body by screw connections. The second induction pipe body may consist of a metal material or plastics. The first induction pipe body may consist of a metal material or plastics. The air induction module may further comprise an electronic control device for controlling the actuators of the pulse charging valves wherein the electronic control device can be attached to an air filter housing of the combustion engine or to the first induction pipe body or second induction pipe body such that it is cooled by the fresh air flowing through the air induction module. The air induction module may further comprise an electronic connector for the line connection between the actuators of the pulse charging valves and the electronic control device, wherein the electronic connector can be integrated in the second induction pipe body. The second induction pipe body may consist of plastics material, and the plastics material of the second induction pipe body can be cast around the electronic connector, which can be electrically connected by a plug connection to the actuators of the pulse charging valves. The air induction module may further comprise an air filter housing, wherein the air filter housing can be attached to the first induction pipe body or to the second induction pipe body. A throttle valve can be attached to the collector of the first induction pipe body.

In the air induction module configured according to the invention, the induction pipe is comprised of two separate induction pipe bodies which are connected to one another by a flanged joint, such that the induction pipe sections provided therein together form the individual induction pipes of the induction pipe. The first induction pipe body contains an air collector and individual induction pipe sections leading off therefrom. The second induction pipe body with its induction pipe sections can be attached to the cylinder head of the combustion engine.

Due to this two-part construction of the induction pipe, one respective pulse charging valve with an associated actuator can be arranged in the induction pipe sections of the second induction pipe body. In principle, the pulse charging valves can be of any construction. Preferably, however, they are comprised of poppet valves, of which the actuators are formed by solenoids.

The invention therefore permits a constructively simple and space-saving integration of the pulse charging valves in the induction pipe. The invention also represents an optimal solution with regard to the vibrational load. It is particularly advantageous that, due to the integration of the pulse charging valves and their actuators in the induction pipe sections of the second induction pipe body, the actuators are surrounded by the air flowing through the induction pipe, ensuring cooling of the actuators and thus the removal of the electrical power loss of the actuators.

The air induction module configured according to the invention is therefore easily suitable for mass production.

Both the first and the second induction pipe body can be manufactured from a metal material, such as for example an aluminum alloy or even a plastics material, such as for example polyamide.

The electronic control device for controlling the actuators of the pulse charging valves can be attached to the air filter housing of the combustion engine such that it is cooled by the air flowing through the air induction module. Instead of this, however, the electronic control device can also be attached to the first or second induction pipe body such that it is cooled by the air flowing through the first and/or second induction pipe body.

In a further embodiment of the invention it is provided that an electronic connector (leadframe) for the line connection between the actuators of the pulse charging valves and the electronic control device is integrated in the second induction pipe body. If the second induction pipe body consists of plastics material, the plastics material of the second induction pipe body is preferably cast around the electronic connector and it can then be electrically connected by a plug connection to the actuators of the pulse charging valves. By means of this integrated electronic contact, a further reduction of the manufacturing costs and an increase in operational reliability result. Moreover, depending on the construction, contacting errors (transposing the cylinders) are avoided.

BRIEF DESCRIPTION OF THE DRAWINGS

An exemplary embodiment of the invention is described in more detail with reference to the drawings, in which.

DETAILED DESCRIPTION

Figure 1:
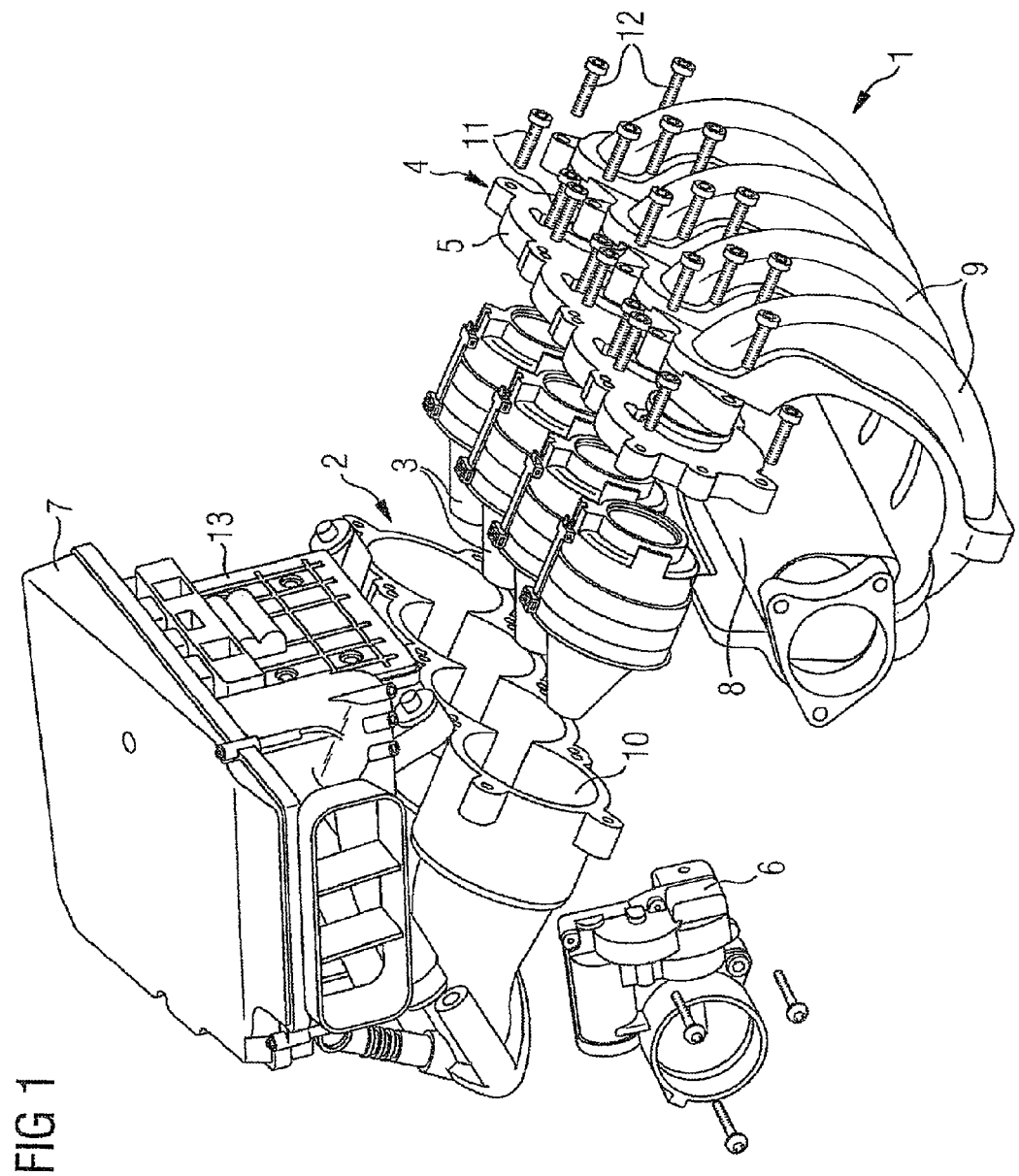
FIG. 1 is a perspective exploded view of an air induction module.
Figure 2:
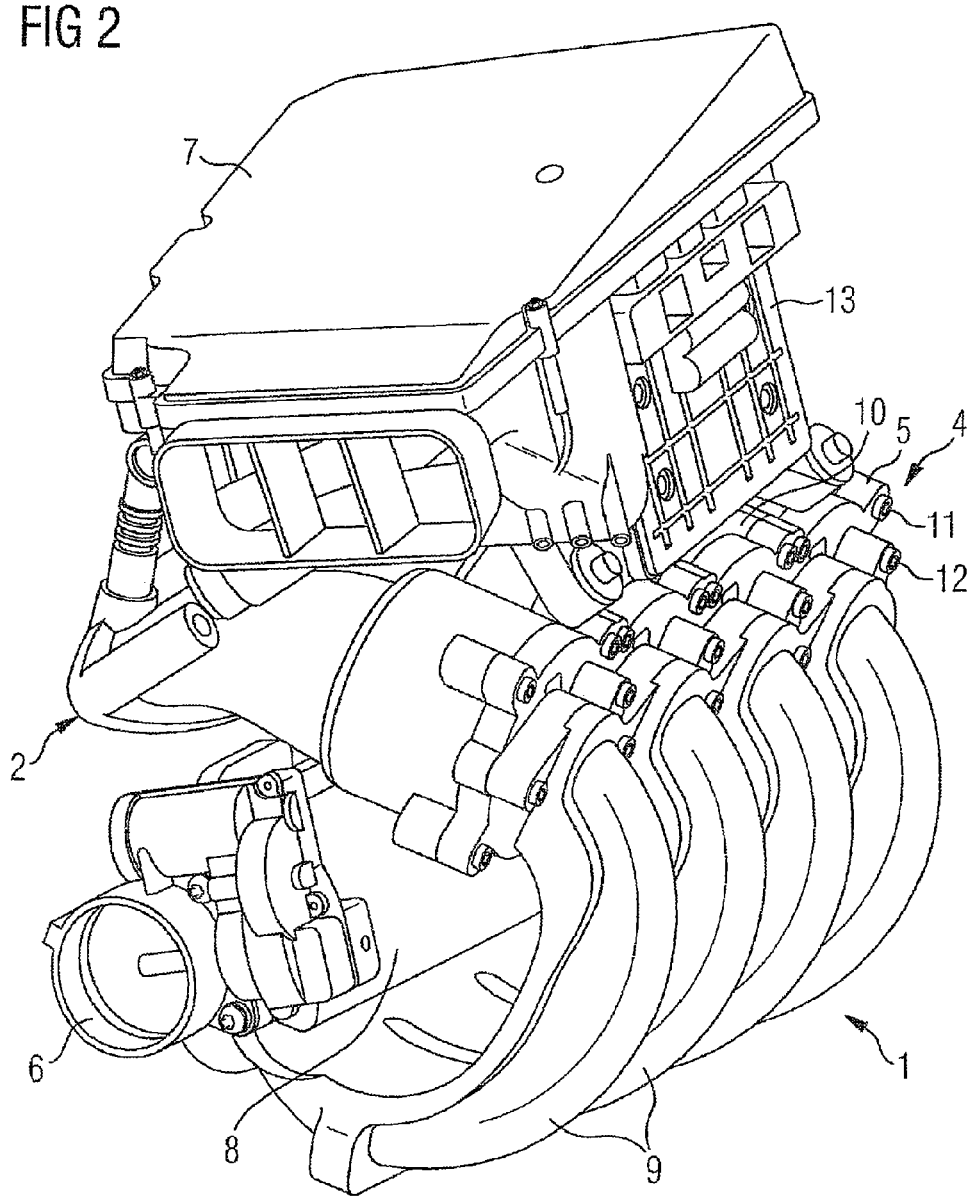
FIG. 2 is a perspective view corresponding to FIG. 1 of the air induction module in the assembled state.
Figure 3:
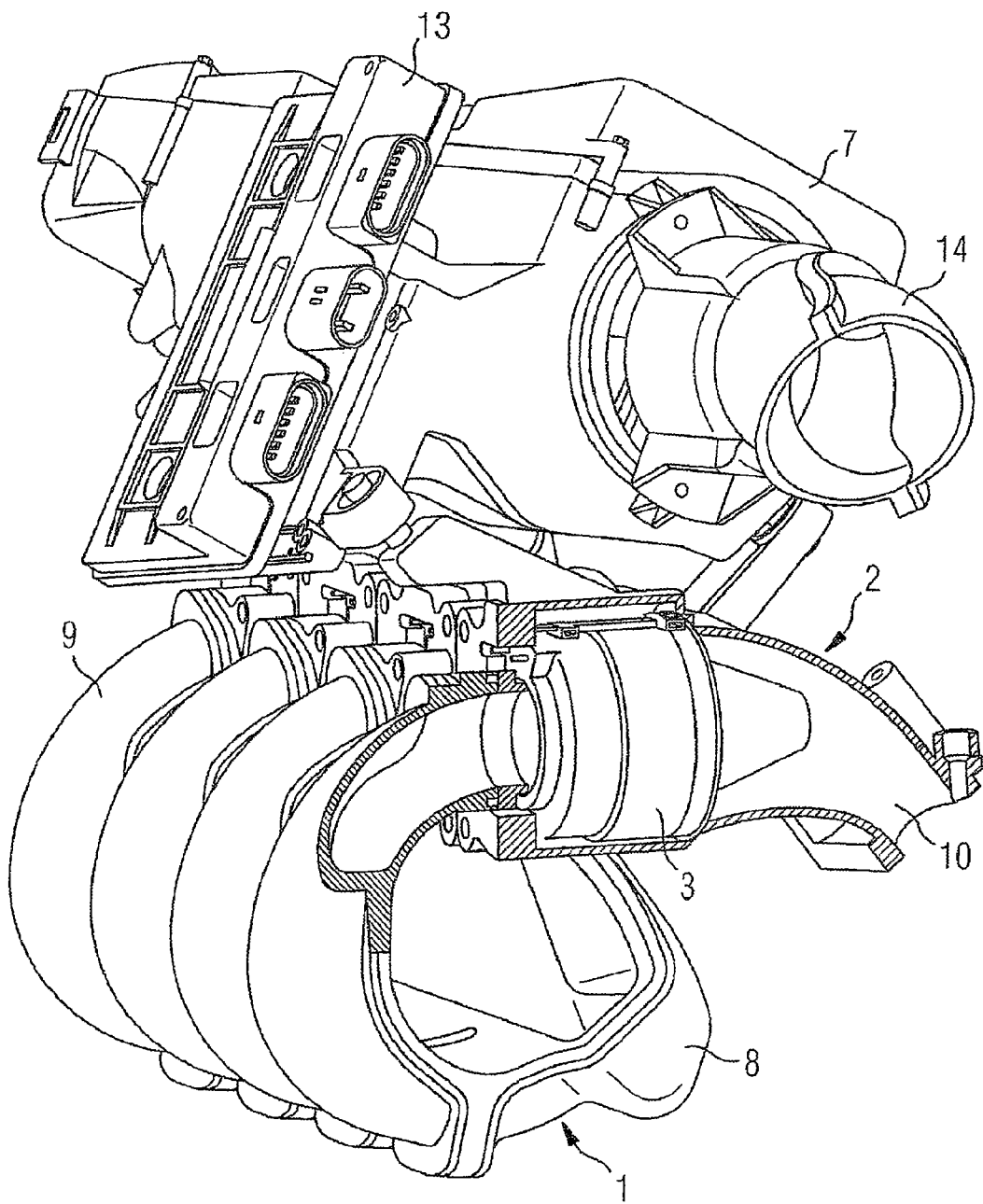
FIG. 3 is a partial sectional perspective view of the air induction module from another viewpoint.

The air induction module shown in FIGS. 1 to 3 serves as an air induction system of a combustion engine (not shown) which can be configured as a petrol or diesel combustion engine and, in the embodiment shown, is a four cylinder combustion engine.

As can be seen, in particular, in the exploded view of FIG. 1, the air induction module comprises an induction pipe which is divided up into a first induction pipe body 1 and a second induction pipe body 2. Furthermore, the air induction module comprises pulse charging valves 3 with associated actuators, which are inserted into the second induction pipe body 2, as will be described in more detail. The two induction pipe bodies 1 and 2 can be connected to one another by a flanged joint 4 with an intermediate plate 5, as will also be described in more detail.

Furthermore, the air induction module has a throttle valve 6 and an air filter housing 7 which can be connected to the throttle valve 6 via a clean air duct 14 which is shown only in part in FIG. 3.

The first induction pipe body 1 comprises an air collector 8 which, on the side which can be seen in FIGS. 1 and 2, has an air inlet with the throttle valve 6 arranged therein. Depending on the number of cylinders, four curved induction pipe sections 9 terminating in a common flange portion are attached to the air collector 8.

The second induction pipe body 2 is also provided with four induction pipe sections 10 which, in the assembled state of the air induction module (see FIGS. 2 and 3), continue the induction pipe sections 9 of the first induction pipe body 1. The induction pipe sections 9 and 10 thus form the individual induction pipes of the induction pipe.

The pulse charging valves 3 visible in FIGS. 1 and 3 are, in the embodiment shown, poppet valves with actuators in the form of solenoids with two respective solenoid coils. Each of the poppet valves with the associated actuator forms a component part which, as such, can be inserted into one respective induction pipe section 10 of the second induction pipe body 2. The pulse charging valves 3 with their actuators are held in the induction pipe sections 10 of the second induction pipe body 2 by the intermediate plate 5, which is attached to the second induction pipe body 2 by screw connections 11.

In this manner, the pulse charging valves 3 with their actuators can be easily inserted into the induction pipe. This arrangement is, moreover, particularly advantageous with regard to space requirements and vibrational load. Moreover, the arrangement is such that the air flowing through the induction pipe is conveyed around the actuators, whereby the actuators are cooled and thus their electrical power loss is effectively removed.

The first induction pipe body 1 is attached to the intermediate plate 5 by screw connections 12. The intermediate plate 5 is provided with through holes which ensure a smooth flow transfer between the induction pipe sections 9 and the induction pipe sections 10 of the two induction pipe bodies 1, 2.

The induction pipe bodies 1 and 2 can consist of a metal material, such as for example an aluminum alloy. Advantageously, however, they consist of plastics material, such as for example polyamide, with the resulting advantages.

An electronic control device 13 is provided to control the actuators of the induction pipe valves 3 which is attached to the air filter housing 7 in the embodiment shown. To this end, the air filter housing has an opening over which the electronic control device is located. In this manner, air flowing through the air filter housing 7 is conveyed past the rear face of the electronic control device 13, whereby the electronic control device 13 is cooled and its electrical power loss is removed.

Instead of the arrangement shown in FIGS. 1 to 3, the electronic control device 13 could be attached to the first induction pipe body 1 or to the second induction pipe body 2, according to the particular installation conditions, so that it is cooled by the air flowing past.

An electrical connector—not shown—(leadframe) which consists of a copper part with electrical conductors and molded plug pins is provided for electrically contacting the actuators of the pulse charging valves. This connector represents the electrical line connection between the actuators of the pulse charging valves 3 and the electronic control device 13.

The electrical connector is expediently integrated in the second induction pipe body 10. If the second induction pipe body 2 is configured as an injection-molded part made of plastics material, the electrical connector is inserted into the plastics injection molding die for the second induction pipe body 2 and during the injection molding process the hot plastics material is injected around said connector, so that only the plug pins protrude from the plastics material. The arrangement is therefore such that when inserting the pulse charging valves 3 with their actuators in the induction pipe sections 10 of the second induction pipe body 2, an electrical contact between the plug pins of the connector and plug sockets provided on the actuators is automatically produced.

In this manner, the electrical contact of the actuators of the pulse charging valves 3 is optimally integrated in the induction pipe which simplifies the manufacture and assembly, increases the operational reliability and in particular avoids contacting errors (i.e. transposing the cylinders).

The invention claimed is:

1. An air induction module for a multi-cylinder combustion engine having pulse charging, with an induction pipe with individual induction pipes depending on the number of cylinders of the combustion engine, wherein the induction pipe comprises:
   a first one-piece induction pipe body with an air collector and individual induction pipe sections and
   a second one-piece induction pipe body with individual induction pipe sections which can be attached to the cylinder head of the combustion engine,
   wherein the first and second induction pipe bodies are connected to one another by a flanged joint in such a way that their induction pipe sections together form the individual induction pipes of the induction pipe,
   one respective pulse charging valve arranged with an associated actuator in the induction pipe sections of the second induction pipe body, and
   the flanged joint between the two induction pipe bodies comprises an intermediate plate with through holes corresponding to the individual induction pipes which can be attached to the second induction pipe body by screw connections such that the intermediate plate holds the pulse charging valves with their actuators in the induction pipe sections of the second induction pipe body.

2. An air induction module according to claim 1, wherein each pulse charging valve with the associated actuator forms a component part which during assembly of the air induction module can be respectively inserted in the correspondingly formed associated induction pipe section of the second induction pipe body.

3. An air induction module according to claim 1, wherein the intermediate plate can be attached to the first induction pipe body by screw connections.

4. An air induction module according to claim 1, wherein the second induction pipe body consists of a metal material or plastics.

5. An air induction module according to claim 1, wherein the first induction pipe body consists of a metal material or plastics.

6. An air induction module according to claim 1, further comprising an electronic control device for controlling the actuators of the pulse charging valves wherein the electronic control device can be attached to an air filter housing of the combustion engine or to the first induction pipe body or second induction pipe body such that it is cooled by the fresh air flowing through the air induction module.

7. An air induction module according to claim 1, further comprising an air filter housing, wherein the air filter housing can be attached to the first induction pipe body or to the second induction pipe body.

8. An air induction module according to claim 1, wherein a throttle valve can be attached to the collector of the first induction pipe body.

9. An induction pipe comprising:
   a first one-piece induction pipe body with an air collector and individual induction pipe sections and
   a second one-piece induction pipe body with individual induction pipe sections which can be attached to a cylinder head of a combustion engine,
   wherein the first and second induction pipe bodies are connected to one another by a flanged joint in such a way that their induction pipe sections together form the individual induction pipes of the induction pipe,
   one respective pulse charging valve arranged with an associated actuator in the induction pipe sections of the second induction pipe body, and
   the flanged joint between the two induction pipe bodies comprises an intermediate plate with through holes corresponding to the individual induction pipes which can be attached to the second induction pipe body by screw connections such that the intermediate plate holds the pulse charging valves with their actuators in the induction pipe sections of the second induction pipe body.

10. An induction pipe according to claim 9, wherein the pulse charging valves are configured as poppet valves.

11. An induction pipe according to claim 10, wherein the actuators of the induction pipe valves consist of solenoids.

12. An induction pipe according to claim 9, wherein each pulse charging valve with the associated actuator forms a component part which during assembly of the air induction module can be respectively inserted in the correspondingly formed associated induction pipe section of the second induction pipe body.

13. An induction pipe according to claim 9, wherein the intermediate plate can be attached to the first induction pipe body by screw connections.

14. An induction pipe comprising:
   a first one-piece induction pipe body with an air collector and individual induction pipe sections and
   a second one-piece induction pipe body with individual induction pipe sections which can be attached to a cylinder head of a combustion engine,
   wherein the first and second induction pipe bodies are connected to one another by a flanged joint in such a way that their induction pipe sections together form the individual induction pipes of the induction pipe,
   one respective pulse charging valve arranged with an associated actuator in the induction pipe sections of the second induction pipe body.
   the flanged joint between the two induction pipe bodies comprises an intermediate plate with through holes corresponding to the individual induction pipes which can be attached to the second induction pipe body by screw connections such that the intermediate plate holds the pulse charging valves with their actuators in the induction pipe sections of the second induction pipe body, and
   an electronic control device for controlling the actuators of the pulse charging valves wherein the electronic control device can be attached to an air filter housing of the combustion engine or to the first induction pipe body or second induction pipe body such that it is cooled by the fresh air flowing through the air induction module.

* * * * *